(12) United States Patent
Mueller et al.

(10) Patent No.: US 10,866,486 B2
(45) Date of Patent: Dec. 15, 2020

(54) NON-LINEAR OPTICAL DEVICE WITH A BROADENED GAIN BANDWIDTH

(71) Applicant: Qioptiq Photonics GmbH & Co KG, Göttingen (DE)

(72) Inventors: Frank Mueller, Munich (DE); Huw Major, Southampton (GB)

(73) Assignee: QIOPTIQ PHOTONICS GMBH & CO. KG, Goettingen (DE)

( * ) Notice: Subject to any disclaimer, the term of this patent is extended or adjusted under 35 U.S.C. 154(b) by 0 days.

(21) Appl. No.: 16/529,992

(22) Filed: Aug. 2, 2019

(65) Prior Publication Data
US 2020/0041869 A1   Feb. 6, 2020

Related U.S. Application Data

(60) Provisional application No. 62/713,580, filed on Aug. 2, 2018.

(51) Int. Cl.
  *G02F 1/355*  (2006.01)
  *G02F 1/35*   (2006.01)

(52) U.S. Cl.
  CPC .......... *G02F 1/3551* (2013.01); *G02F 1/3558* (2013.01); *G02F 2001/3548* (2013.01)

(58) Field of Classification Search
  CPC .................. G02F 1/3551; G02F 1/3558; G02F 2001/3548
  See application file for complete search history.

(56) References Cited

U.S. PATENT DOCUMENTS

| | | | | |
|---|---|---|---|---|
| 5,644,422 | A * | 7/1997 | Bortz | G02F 1/37 359/326 |
| 6,882,465 | B1 * | 4/2005 | Boulanger | G02F 1/3501 359/326 |
| 7,433,373 | B2 * | 10/2008 | Huang | H01S 3/115 372/10 |
| 8,054,536 | B2 | 11/2011 | Gawith et al. | |
| 8,199,396 | B2 * | 6/2012 | Kusukame | G02B 27/102 359/326 |
| 8,446,580 | B2 * | 5/2013 | Cerullo | G01J 3/44 356/301 |
| 8,542,435 | B2 * | 9/2013 | Raybaut | G02F 1/3544 359/330 |
| 2008/0044147 | A1 * | 2/2008 | Patel | G02F 1/3558 385/122 |
| 2017/0356734 | A1 * | 12/2017 | Hendon | G01B 9/02091 |

OTHER PUBLICATIONS

Major, et al; "Flat-top temperature tuning response in periodically-poled nonlinear crystals"; Event: International Congress on Optics and Optoelectronics, 2007, Prague, Czech Republic.
Houe, et al; "An introduction to methods of periodic poling for second-harmonic generation"; 1995 IOP Publishing Ltd.
Gregory David Miller; "Periodically Poled Lithium Niobate: Modeling, Fabrication, and Nonlinear-Optical Performance", Dissertation, Stanford University, Jul. 1998.

\* cited by examiner

*Primary Examiner* — Daniel Petkovsek
(74) *Attorney, Agent, or Firm* — Peter A. Nieves; Sheehan Phinney Bass & Green PA

(57) ABSTRACT

An optical crystal for converting an input light beam, the crystal having an ingress surface, an egress surface, and a fan-out grating has a fan-out pattern oriented at an offset angle θ in the range of 1° to 45° with respect to a beam entry plane at a beam ingress location.

8 Claims, 8 Drawing Sheets

```
┌─────────────────────────────────────────────────────────┐
│ Receive an optical crystal comprising a fan-out grating │
│ oriented relative to a fan-out plane, a first ingress   │
│ surface and a first egress surface.                     │
│                         810                             │
└─────────────────────────────────────────────────────────┘
                              │
                              ▼
┌─────────────────────────────────────────────────────────┐
│ Resurface the optical crystal to replace the first      │
│ ingress surface with a second ingress surface and/or    │
│ replace the first egress surface of the crystal with a  │
│ second egress surface so that a second ingress surface  │
│ and/or a second egress surface is oriented at the angle │
│ θ with respect to the first egress surface and/or the   │
│ second egress surface.                                  │
│                         830                             │
└─────────────────────────────────────────────────────────┘

NON-LINEAR OPTICAL DEVICE WITH A BROADENED GAIN BANDWIDTH

CROSS-REFERENCE TO RELATED APPLICATIONS

This application claims the benefit of U.S. Provisional Patent Application Ser. No. 62/713,580, filed Aug. 2, 2018, entitled "Non-linear Optical Device with a Broadened Gain Bandwidth," which is incorporated by reference herein in its entirety.

FIELD OF THE INVENTION

The present invention relates to optics, and more particularly, is related to non-linear optical frequency conversion devices.

BACKGROUND OF THE INVENTION

Figure 1:
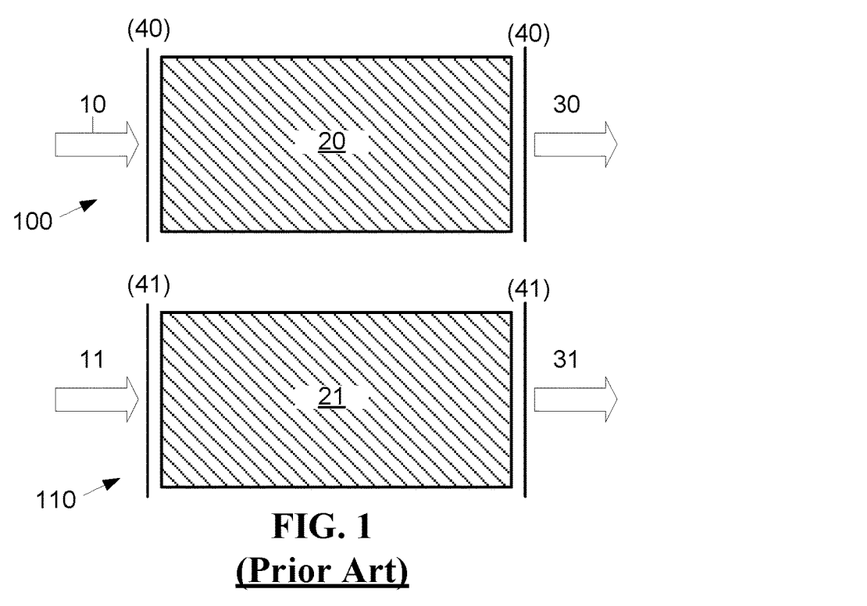
FIG. 1 is a schematic diagram showing two prior art optical devices.
Figure 2:
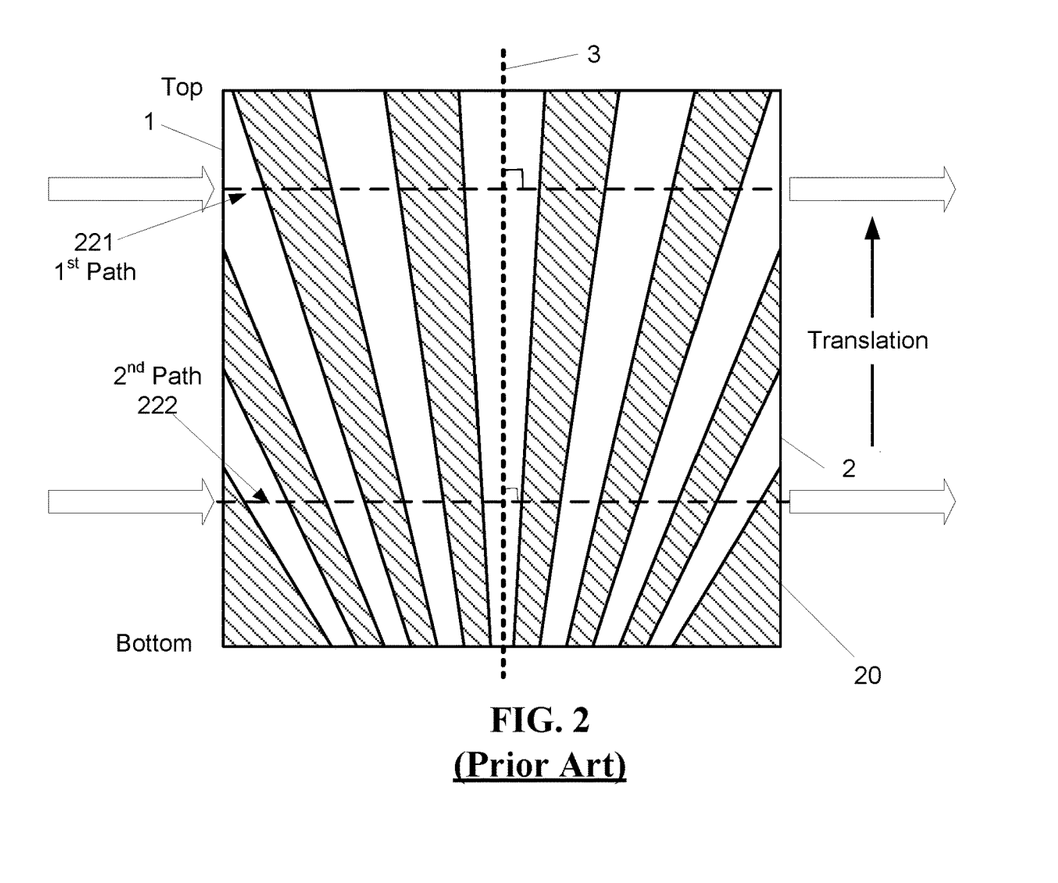
FIG. 2 is a detail of a fan-out crystal grating of the first device of FIG. 1.

Non-linear optical devices may be used to convert an input light beam having a first wavelength into an output light beam having a second wavelength, where the second wavelength may be harmonically related to the first wavelength. FIG. 1 shows a first non-linear optical device 100 having a crystal with a fan-out grating structure 20 optionally within a resonating cavity 40, where an input light beam, for example a laser beam 10 enters the device and an output light beam 30 exits the device. FIG. 2 shows a detail of the fan-out grating structure 20. The fan-out grating structure 20 includes a series of successive wavelength conversion regions that are formed in a fan pattern such that the fan-out pattern is narrower at a first (bottom) side of the structure 20 and wider at a second (top) side of the structure 20, the fan pattern typically being symmetrically formed around a fan-out pattern orientation line 3, which is typically a center line of symmetry of the fan-out pattern. The fan-out grating structure 20 produces a continuously varying phase-matching condition across the aperture width of the device 100. Since the beam-diameters are very small, the beam effectively traverses only one period at a time. The shaded portions of the fan-out grating structure 20 have opposite optical axis with respect to the unshaded portions of the fan-out grating structure 20.

The length of the periods of the shaded/unshaded portions determines the wavelength to be converted and the conversion process that is used (for example, depending whether the crystal is an Optical-Parametric Oscillation (OPO) crystal or a second harmonic generator). If the poling periods are discrete, then a continuous fine-tuning of the phase-matching-condition is not possible via crystal translation. The period of the device 100 may be translated depending upon the position of an input light beam in relation to the crystal 20. For example, the period (the number of shaded/unshaded transitions traversed by the light beam) is smaller toward the bottom of the crystal 20 than toward the top of the crystal 20. So a second path 222 has a higher period than a first path 221. The first path 221 and second path 222 are generally normal to surface of the crystal 20, and therefore are normal to the fan-out pattern orientation line 3. The difference of the period at the top of the fan-out grating structure 20 compared to the period at the bottom of the fan-out grating structure 20 may be, for example, on the order of 10 percent. Effectively, this arrangement may be used so that a single crystal 20 may be tuned to a range of input wavelengths. Wavelength-tuning across a broad range is achieved with the crystal 20 oriented orthogonally with respect to the incident laser beam 10. The crystal 20 may be tuned to the wavelength of the laser beam 10 by translating its position relative to the incoming beam 10 with respect to the period of the fan-out grating 20.

Figure 3:
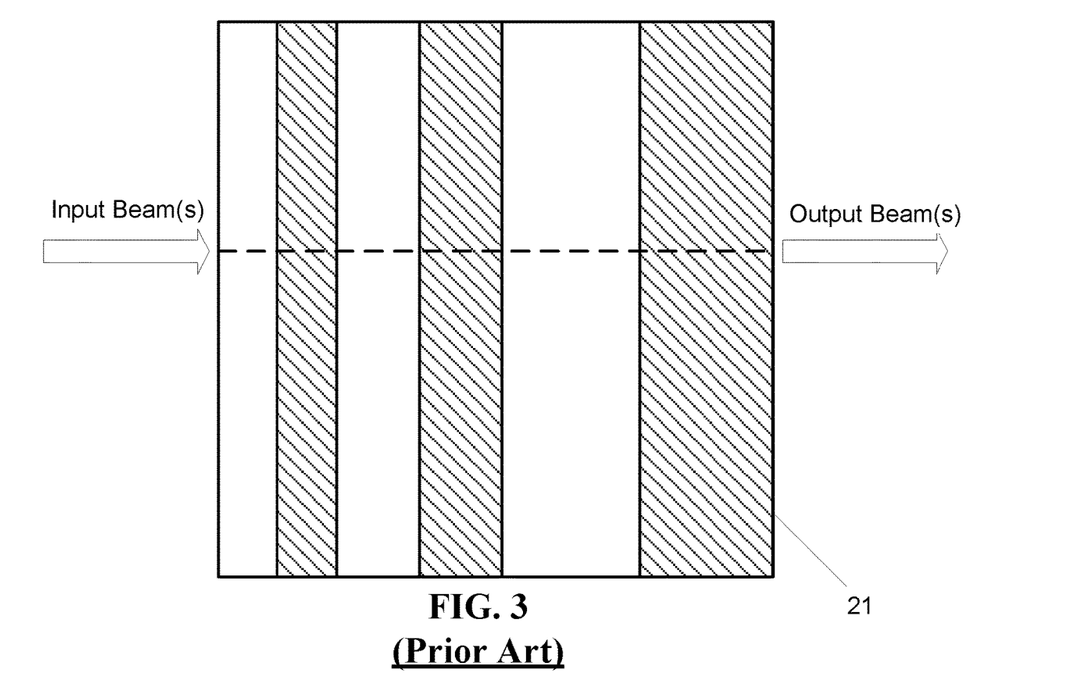
FIG. 3 is a detail of the chirp crystal grating of the second device of FIG. 1.

A second non-linear optical device 110 has a crystal with a chirped periodically poled grating structure 21 optionally within a resonating cavity 41, where an input laser beam 11 enters the device 110 and an output light beam 31 exits the device 110. FIG. 3 shows a detail of the chirped grating structure 21. As can be seen by FIG. 3, the shaded and unshaded regions of varying widths represent different periods, where the shaded portions of the chirped periodically poled grating structure 21 have opposite optical axis with respect to the unshaded portions of the chirped periodically poled grating structure 21.

The lengths of the bands change along the length of the crystal relative to the input beam 12. In normal dispersive materials, for example lithium Niobate, bands having shorter lengths interact more efficiently with shorter wavelengths of the input beam 12, and bands having longer lengths interact more efficiently with longer wavelengths of the input beam 12.

Nonlinear devices 21 utilizing crystals designed with chirped periodically poled gratings are formed so the grating period chirps along the path the incident laser beam 11, affording a constantly varying phase-matching condition along the length of the device 21. Compared with the first device 100, this results in a broader wavelength bandwidth over which nonlinear processes can efficiently occur, so that a broader band of wavelengths may be transformed. In literature phrases like "broad acceptance bandwidth" or "broad gain-bandwidth" describe the same phenomena. However, the central operating wavelength of the second non-linear optical device 110 is not effectively tunable via crystal translation as the first. There is a need in the industry to address one or more of the abovementioned shortcomings.

SUMMARY OF THE INVENTION

Embodiments of the present invention provide a non-linear optical device with a broadened gain bandwidth. Briefly described, the present invention is directed to an optical crystal for converting an input light beam having an ingress surface, an egress surface, and a fan-out grating with a fan-out pattern oriented at an offset angle θ in the range of 1° to 45° with respect to a beam entry plane at a beam ingress location.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

DETAILED DESCRIPTION

The following definitions are useful for interpreting terms applied to features of the embodiments disclosed herein, and are meant only to define elements within the disclosure.

As used within this disclosure, "substantially" means "almost exactly," or to within normal manufacturing tolerances, for example, substantially parallel or substantially normal may indicate insubstantial variations from parallel or normal angles.

As used within this disclosure, a "fan-out orientation line" indicates a line within a fan-out crystal that is oriented normal to the intended light path through the crystal. In general, within this application the fan-out pattern of a crystal referred to herein describes the pattern in a plane (depicted as the x-y plane in the drawings) that includes the light beam ingress location and the light beam egress location. Similarly, a rotation of the fan-out pattern indicates a rotation relative to the x-y plane, for example, around an axis α in the z-plane.

Reference will now be made in detail to embodiments of the present invention, examples of which are illustrated in the accompanying drawings. Wherever possible, the same reference numbers are used in the drawings and the description to refer to the same or like parts.

Figure 4:
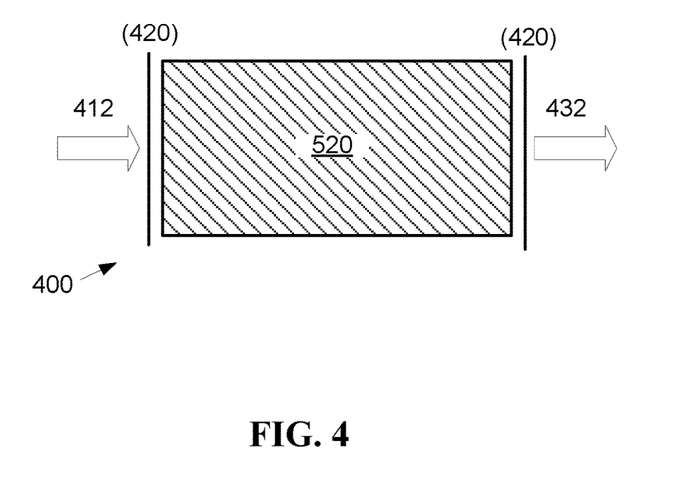
FIG. 4 is a schematic diagram showing an exemplary first embodiment of an optical device.

FIG. 4 shows a first embodiment of a nonlinear device 400 utilizing a crystal 520 optionally disposed within a resonating cavity 420, where an input radiation 412, a laser beam for example, enters the device and an output light beam 432 exits the device. The first embodiment may use a nonlinear crystal 520 to convert input radiation 412 into output radiation 432 having different wavelengths than the input radiation 412. The crystal 520 may be configured for several different processes, for example, but not limited to:

a) SHG (Second-Harmonic-Generation)
b) SFG (Sum-Frequency-Generation)
c) DFG (Difference-Frequency-Generation)
d) OPG/OPO (Optical-Parametric-Generation/-Oscillation)

For an OPO-process the crystal is disposed inside a resonating cavity, while for SHG, SFG and DFG the crystal may optionally be disposed within a resonating cavity according to the needs of an application, for example if an enhancement of the power-level of a beam is desired.

For wide wavelength tunability, a periodically Ferro electrically poled crystal 520 with fan-out grating 540 may be used. For nonlinear processes involving wavelength-modulated or broadband radiation often chirped gratings may be preferred. The first embodiment preferably uses a crystal 520 having a chirped fan-out grating 540. Some of these crystals 520 may use a rotated fan-out pattern 540, referred to herein as a "quasi-chirped fan fan-out" pattern. In order to avoid problems arising from dispersion effects, for example, beam-walk-off or angles between beams of different wavelengths outside the crystal 520, the first embodiment 400 (FIG. 4) cuts the crystal 520 to a rectangular, spherical, or cylindrical piece as described further below. Alternative embodiments may have different shapes of the crystal 520.

Figure 5A:
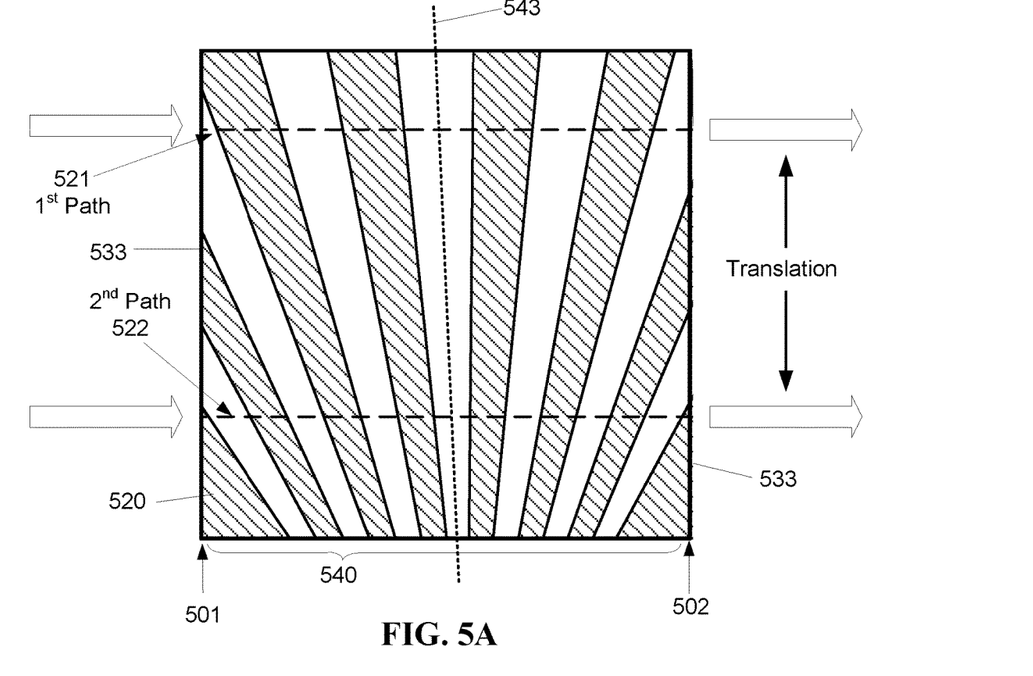
FIG. 5A is a detail of an angled fan-out crystal grating of the first embodiment of FIG. 4.
Figure 5B:
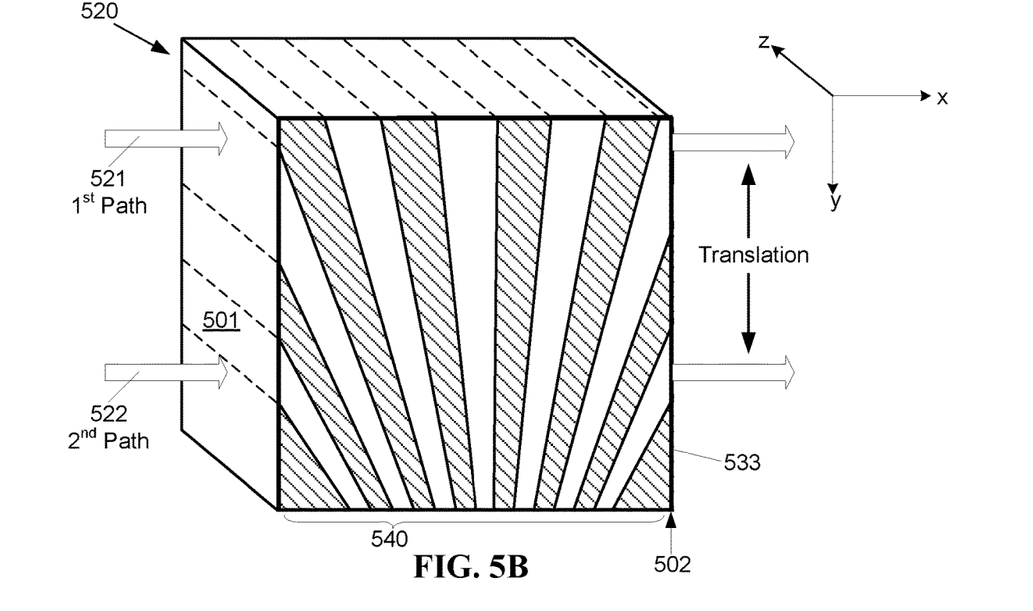
FIG. 5B is a perspective view of the first embodiment of FIG. 5A

FIGS. 5A and 5B show a quasi-chirped fan-out crystal 520 having a quasi-chirped fan fan-out pattern 540. Under the first embodiment, the quasi-chirped fan-out crystal 520 includes the quasi-chirped fan fan-out pattern 540 (shown as alternating white and hashed regions) having a fan-out orientation line 543 rotated at an angle θ (FIG. 6A) in the x-y plane with respect to a light ingress surface 501 and a light egress surface 502, where the angle θ is a non-zero degree angle, for example, in the range of 1° to 45°. This is explained in greater detail below regarding FIGS. 6A and 6B.

Figure 6A:
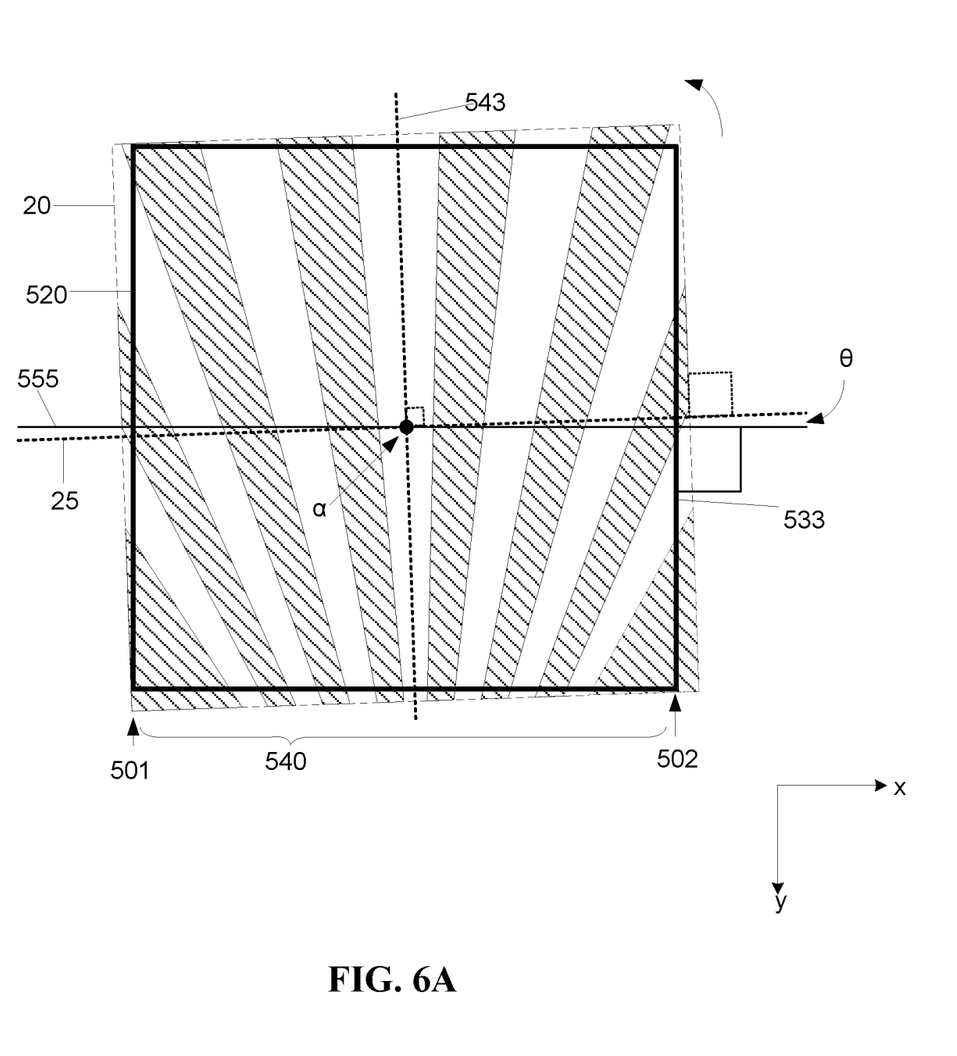
FIG. 6A is a detail of the angled fan-out crystal grating of the first embodiment of FIG. 5A overlaid with the non-angled fan-out grating of FIG. 2.

FIG. 6A shows a prior art fan-out grating pattern of the prior art crystal 20 (FIG. 1) overlaid upon the quasi-chirped fan-out crystal 520. The quasi-chirped fan-out crystal 520 is shown outlined with a solid line 533, with a solid (x-axis) center line 555 normal to the ingress surface 501 and the egress surface 502 of the quasi-chirped fan-out crystal 520. Similarly, a center line 25 of the prior art crystal fan-out 20 (shown as a dashed line 25) is normal to the fan-out orientation line 3 (FIG. 2) of the prior art crystal fan-out 20.

The quasi-chirped fan fan-out pattern 540 of the quasi-chirped fan-out crystal 520 is oriented at an angle θ in the x-y plane compared to the fan-out pattern of the prior art crystal fan-out 20. The pattern of the quasi-chirped fan-out crystal 520 may be thought of as being rotated by the angle θ compared to the prior art crystal fan-out 20 around an axis α that runs parallel to the light ingress surface 501 (which may be substantially planar in the y-z plane) and the light egress surface 502 and normal to the x-y plane of the center lines 25, 555. Note that while FIG. 6A shows the axis α located substantially at the midpoint of the center lines 25, 555, in alternative embodiments the axis α may be located at other positions along the center lines 25, 555. Further, while FIGS. 5 and 6A show the rotation of the center line 25 of the fan-out pattern 20 by angle θ as counter-clockwise to the center line 555 of the quasi-chirped fan-out crystal 520, in alternative embodiments the rotation may be clockwise.

Figure 6B:
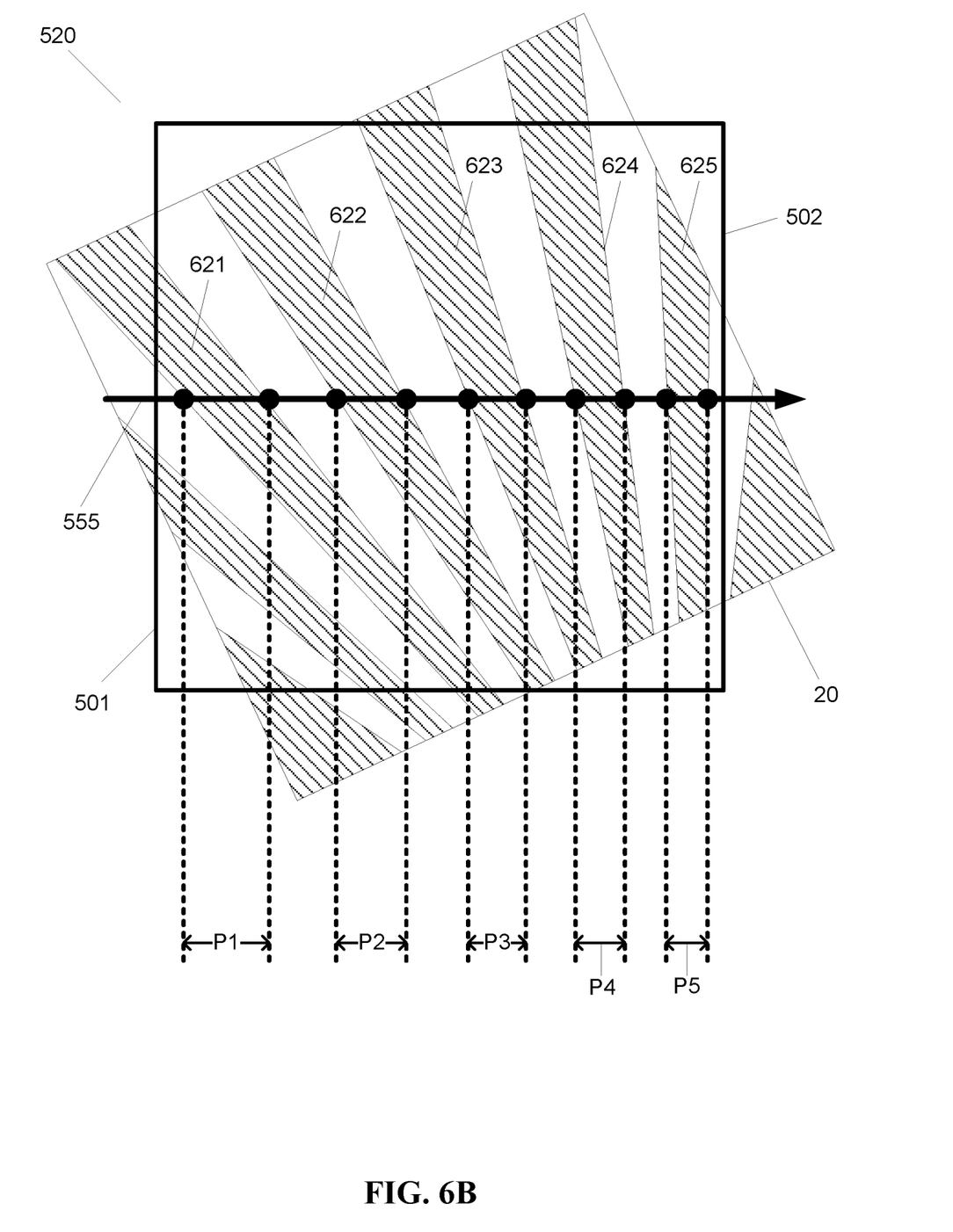
FIG. 6B is a view of the fan-out crystal grating of the first embodiment of FIG. 5A with an exaggerated rotation angle for illustrative purposes.

FIG. 6B shows the first embodiment crystal 520 with an exaggerated rotation angle of the fan-out pattern 20 compared to FIG. 6A for the purpose of demonstrating the quasi-chirped grating aspects of the crystal 520. In particular, a path 555 through the crystal 520 enters the crystal 520 at the ingress surface 501, traverses the fan-out structure across different bands of the fan-out pattern 20, and exits the crystal 520 at the egress surface 502, so the periods of the bands of the fan-out pattern 20 is uneven across the path 555. Here, the path 555 first crosses a first shaded band 621, then crosses a second shaded band 622, thereafter crossing a third shaded band 623, a fourth shaded band 624, and a fifth shaded band 625, where the angle of the respective band with respect to the path 555 is different for different shaded bands, and as a result, the length of a segment of the path 555 crossing each shaded band 621-625 is different, and correspondingly a quasi-chirp period P1-P5 corresponding to each shaded band 621-625 is different, where the first quasi-chirp period P1 corresponds to the first shaded band 621, the second quasi-chirp period P2 corresponds to the second shaded band 622, the third quasi-chirp period P3 corresponds to the third shaded band 623, the fourth quasi-chirp period P4 corresponds to the fourth shaded band 624, and the fifth quasi-chirp period P5 corresponds to the fifth shaded band 625. The quasi-chirp periods P1-P5 shown in FIG. 6B get progressively shorter starting with the longest, the first quasi-chirp period P1, and getting gradually smaller for each of the second quasi-chirp period P2, the third quasi-chirp period P3, the fourth quasi-chirp period P4, and the fifth quasi-chirp period P4. The different period lengths across the path 555 result in the quasi-chirped behavior of the crystal 520.

It should be noted that the progression of a longer period to a shorter period is a result of a counter-clockwise rotation of the fan-out pattern 20 with respect to the crystal 520. A clockwise rotation of the fan-out pattern 20 with respect to the crystal 520 instead results in the path 555 first crossing the shortest band, with the periods getting progressively longer along the path 555. While for simplicity, only the periods of the shaded bands 621-625 are discussed here, the discussion is similarly applicable to the unshaded bands. FIG. 6B only shows five shaded bands along the light beam path 555 for clarity, although there may be many more bands in the crystal 520.

Returning to FIG. 5A, the path of the light beam may be translated relative to the ingress surface 501 (along the y-axis, for example) to tune the performance of the nonlinear device 400 (FIG. 4). For example, a first beam of light following the first path 521 will traverse a different set of fan-out grating periods P1-P5 (FIG. 6B) than, a second beam of light following the second path 522. The first embodiment 520 may be thought of as a rotated (in the x-y plane) and resurfaced version of the prior art fan-out crystal grating 20 (FIG. 2). As a result, different translated light paths typically traverse a different number of gratings (noting that the drawings show a grating pattern with unusually wide gratings for purposes of clarity).

Examples of crystal-materials allowing for ferroelectric poling include doped and undoped variants of lithium Niobate, lithium tantalite or potassium titanyl phosphate, among others. Other poling methods are possible, for example, orientation patterned growth, used for example, with Gallium Arsenide, which does not allow for ferroelectric poling. Crystal sizes may be limited by the grow size of an initial crystal boule, as a non-limiting example, from 1-80 mm. In general, the rotation angle θ may depend on crystal-size, the fan-out design in detail, and the desired broadening of bandwidth, for example, but not limited to 1° and 45°. The number/widths of grating transition regions may depend on the material, the wavelengths in detail and the conversion process. For example, an OPO based on MgO doped lithium Niobate and having a pump-wavelength of 1064 nm utilized poling-period lengths (=one shaded and one unshaded) of 29-32 μm to emit wavelengths of 1.45-2 μm and 2.3-4 μm. As another example, an SHG crystal to transfer wavelengths of 1000-1600 to 500 to 800 nm would have poling-periods of approximately 6 to 13 μm on MgO-LN. The operational temperature range may be, for example, from room-temperature up to 200° C. or more, although for a fan-out, it may be preferable to set a fixed temperature and then translate. In general ranges for input bandwidths and wavelengths are selected according to the specific desired process, for example, a length of crystal and (in case of chirping) on the chirp implementation.

Figure 7A:
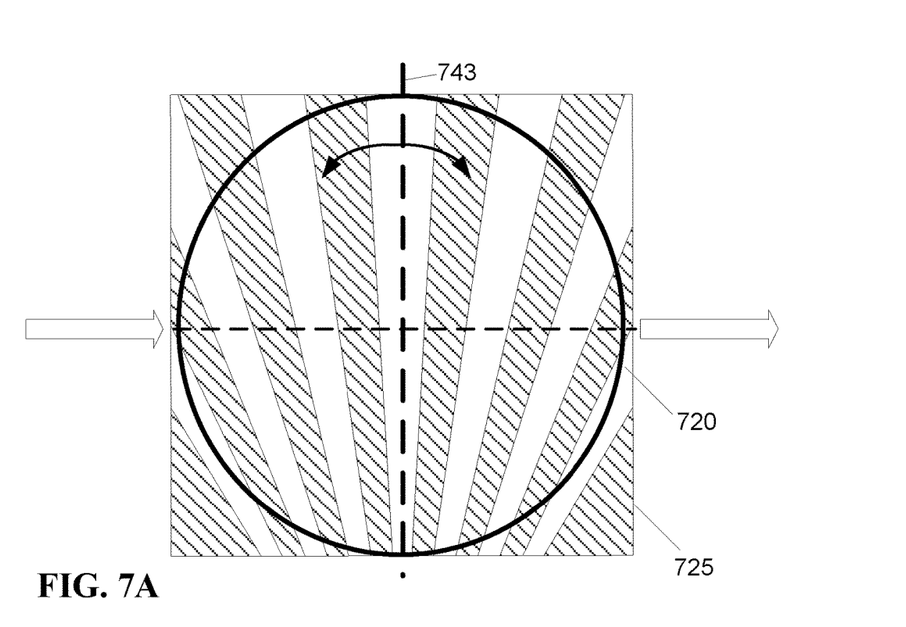
FIG. 7A is a second embodiment of a fan-out crystal grating with a circular profile.
Figure 7B:
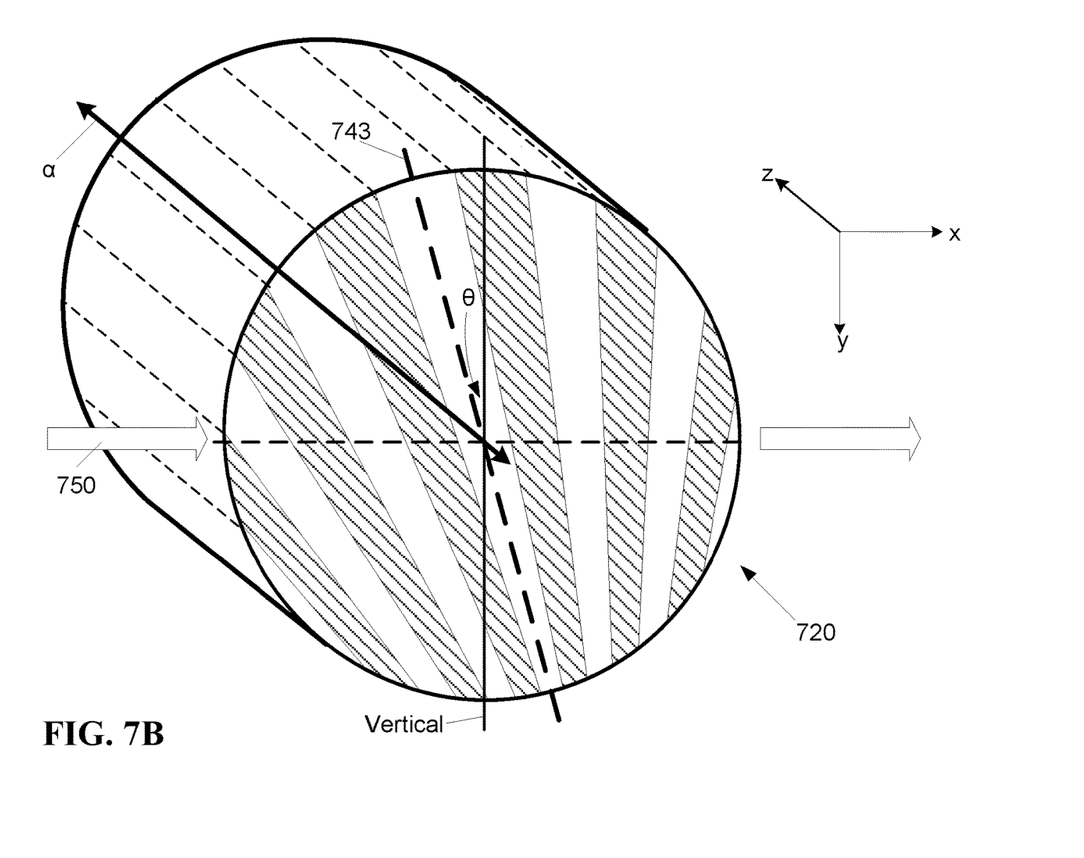
FIG. 7B is a partially rotated view of the second embodiment of a fan-out crystal grating with a circular profile

FIGS. 7A-7B show a second embodiment of a fan-out crystal grating 20 (FIG. 2) having a circular/cylindrical profile, shown in a cross-sectional view. Under the second embodiment, the fan-out crystal 720 includes a grating fan-out pattern 725 (shown as alternating white and hashed regions) oriented in an x-y plane normal to an axis α of the cylindrical profile. The fan-out pattern has a fan-out orientation line 743.

FIG. 7A shows an outline of the crystal profile overlaid with the fan-out grating 725, where FIG. 7B shows a rotated view of the crystal 720. Here, the angle of the light beam 750 with respect to the orientation of the fan-out grating may be adjusted by rotating the crystal 720 around a center axis α (along the z-axis) of the circular/cylindrical profile by a desired amount (shown by the angle θ), so that the path of the light beam 750 through the grating changes based on the amount of rotation of the crystal 720 with respect to the fan-out pattern 725. For example, the crystal 720 may be held in a rotating mount that may be manually rotated or mechanically rotated (for example via motor or galvanometer, among others) to the desired orientation of the fan-out grating 725 with respect to the light beam 750 passing through the crystal 720.

The second embodiment crystal 720 may effectively provide a similar result as the quasi-chirped fan-out crystal 520 of FIG. 5A. It may be preferable to modify the second embodiment crystal 720 to compensate for the cylindrical lens effect, for example, by putting a rectangular piece of optical material with an interior cut-out (round, for example) around the crystal, preferably of a material having substantially the same refractive index as the crystal (or MgO: Lithium Niobate). Reducing any gap between the crystal and the optical material likewise reduces the cylindrical lens effect.

Note that FIGS. 7A and 7B merely illustrate one exemplary scheme. Alternatively, higher crystals may be used where the crystal is cut off at different center position with respect to the fan-out pattern, resulting in a different poling-period length.

Figure 8:
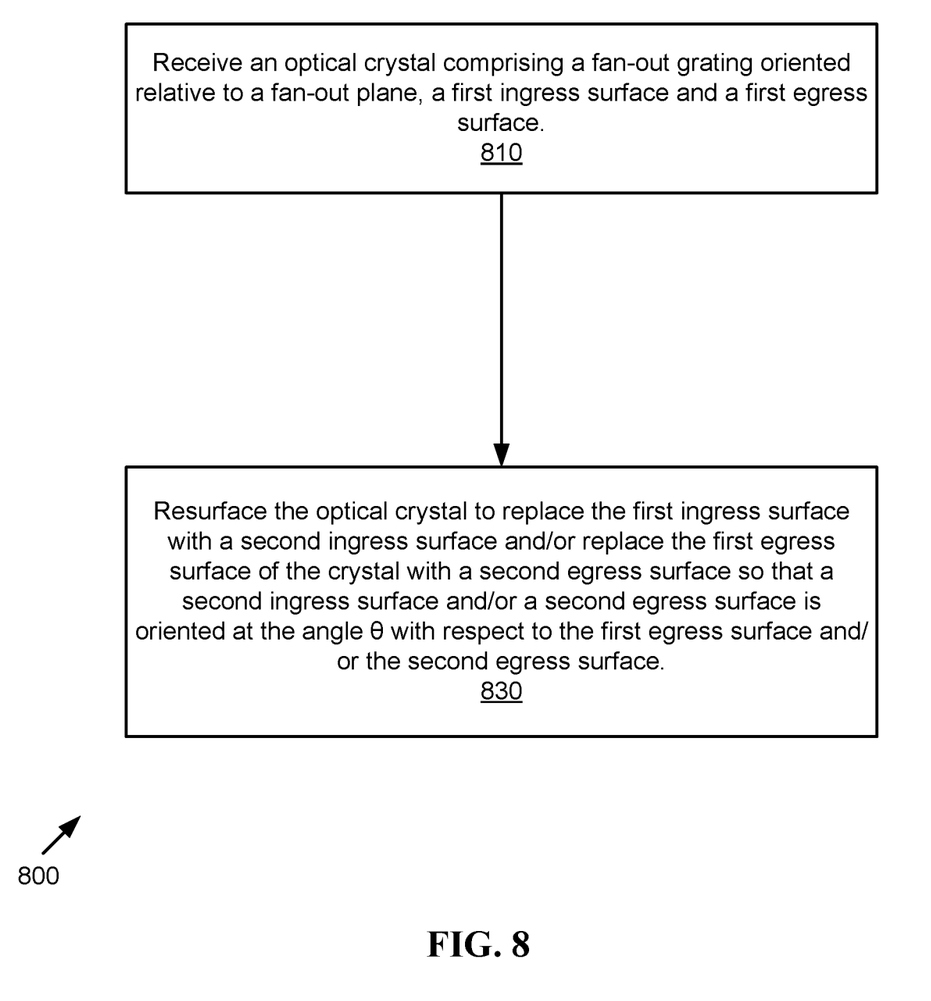
FIG. 8 is a flowchart of an exemplary embodiment of a method for forming a fan-out crystal grating.

FIG. 8 is a flowchart of an exemplary embodiment of a method for forming a fan-out crystal grating. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

An optical crystal comprising a fan-out grating, a first ingress surface 1 (FIG. 2) and a first egress surface 2 (FIG. 2) is received, as shown by block 810. For example, the optical crystal may be a substantially rectangular block. The fan-out grating may have a fan-out pattern orientation line 3 (FIG. 2) that is substantially parallel to the first ingress surface 1 (FIG. 2) and/or the first egress surface 2 (FIG. 2).

The crystal is resurfaced so that a second ingress surface 501 (FIG. 5A) and/or a second egress surface 502 (FIG. 5A) is oriented at an angle θ with respect to the first ingress surface 1 (FIG. 2) and/or the first egress surface 2 (FIG. 2), as shown by block 830.

Alternatively, the crystal grating may be initially formed within the crystal at a desired angle offset to an ingress and/or egress surface. One of several known approaches to creating a nonlinear grating is by the application of a spatially structured electric field to a Ferro-electric material, such as lithium Niobate, above the coercive field of the material, to effect a permanent re-orientation of the atomic crystal structure.

The above embodiments may be modified to use different grating patterns. In one alternative embodiment the fan-out and chirping effect may be achieved by using ordinary periodically poled crystals but additionally including a gradient of the refractive index along the y-axis (FIG. 5B) and/or the x-axis, for example, by using the electro-optic-effect or temperature gradients.

Figure 9:
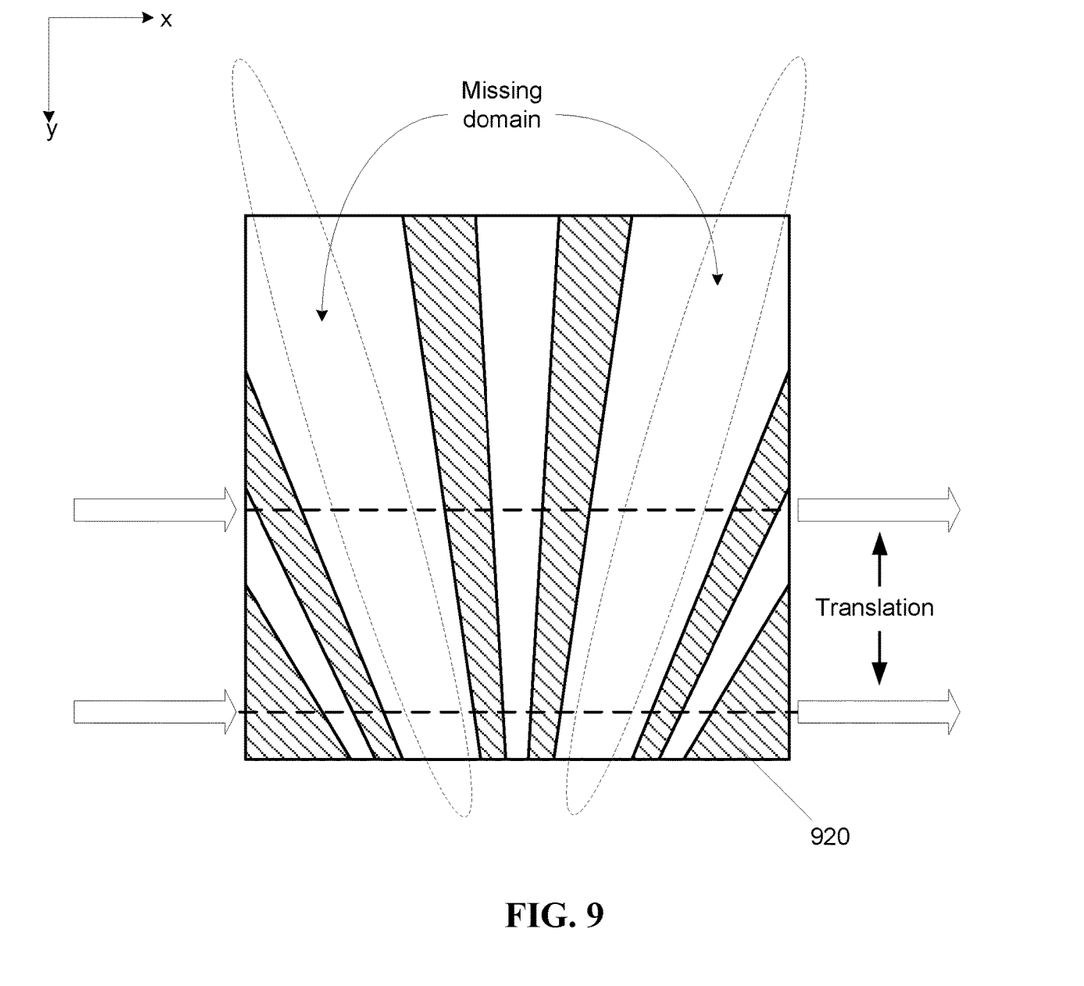
FIG. 9 is a schematic diagram of an embodiment of a crystal fan-out pattern with domains in the grating structure.

In another alternative embodiment the fan-out and enhanced bandwidth effect may be achieved by using fan-out poled crystals with deliberate phase-shifts and missing poled domains fabricated during the poling process. Wavelength tuning may achieved via lateral translation along the y-axis (FIG. 5B), as for a standard fan-out device. Enhanced bandwidth is provided for all wavelengths by phase-shifts and missing domains in the grating pattern 920, as shown by FIG. 9. The bandwidth may be arbitrarily tailored to match the design requirements through subtle changes to the locations of phase-shifts and the number of missing domains. The fabrication difficulties are no more complex than a standard fan-out device, unlike devices that combine chirped gratings with a fan-out.

In summary, it will be apparent to those skilled in the art that various modifications and variations can be made to the structure of the present invention without departing from the scope or spirit of the invention. For example, while FIG. 5A shows an embodiment where the egress surface 502 is parallel with the ingress surface 501, in alternative embodiments the egress surface 502 may be oriented at an angle $\varphi$ with respect to the ingress surface. In view of the foregoing, it is intended that the present invention cover modifications and variations of this invention provided they fall within the scope of the following claims and their equivalents.

What is claimed is:

1. A non-linear optical device for converting an input light beam comprising:
    a tunable quasi-chirped optical crystal comprising:
        an ingress surface;
        an egress surface; and
        a fan-out grating comprising a quasi-chirped fan-out pattern comprising a plurality of successive wavelength conversion regions with a fan-out pattern orientation line oriented at an offset angle $\theta$ in the range of 1° to 45° with respect to a beam entry plane of the ingress surface at a beam ingress location on the ingress surface,
    wherein the fan-out pattern orientation line is a center line of symmetry of the fan-out pattern, and the offset angle $\theta$ results in the quasi-chirped fan-out pattern being arranged with respect to the crystal so a light path from the ingress surface beam ingress location and the egress surface and normal to the beam entry plane through the crystal traverses a plurality of successive wavelength conversion regions, and a length of each of the plurality of successive wavelength conversion regions along the light path is different.

2. The non-linear optical device of claim 1, wherein the ingress surface and egress surfaces are substantially planar.

3. The non-linear optical device of claim 2, wherein the egress surface is substantially parallel to the ingress surface.

4. The non-linear optical device of claim 1, wherein the optical crystal is used for a type of non-linear frequency conversion selected from one of the group consisting of second-harmonic-generation, sum-frequency-generation, difference-frequency-generation, optical-parametric-generation, and optical-parametric-oscillation.

5. The non-linear optical device of claim 4, wherein the optical crystal is tunable to emit the converted input beam with a tunable wavelength, the converted beam having a linewidth greater than 100 GHz.

6. The non-linear optical device of claim 1, wherein the fan-out pattern further comprises a deliberate phase-shift and/or a missing poled domains.

7. The non-linear optical device of claim 1, further comprising a resonating cavity, wherein the optical crystal is disposed within the resonating cavity.

8. A method for forming a non-linear optical device for converting an input light beam comprising the step of:
    applying a spatially structured electric field to a Ferro-electric material of an optical crystal above a coercive field of the material, to effect a permanent re-orientation of the atomic crystal structure, the spatially structure electric field configured to form in the optical crystal a tunable quasi-chirped fan-out grating comprising a fan-out orientation line oriented at an angle $\theta$ with respect to parallel of a crystal ingress surface,
    wherein the angle $\theta$ is in the range of 1° and 45°, the fan-out grating comprises a quasi-chirped fan-out pattern comprising a plurality of successive wavelength conversion regions, the fan-out pattern orientation line is a center line of symmetry of the fan-out pattern, and the offset angle $\theta$ results in the quasi-chirped fan-out pattern being arranged with respect to the crystal so a light path from the ingress surface beam ingress location and the egress surface and normal to an ingress surface beam entry plane through the crystal traverses a plurality of successive wavelength conversion regions, and a length of each of the plurality of successive wavelength conversion regions along the light path is different.

* * * * *